United States Patent [19]

Beller

[11] Patent Number: 5,195,423
[45] Date of Patent: Mar. 23, 1993

[54] SMOKER ASSEMBLY

[75] Inventor: Frank W. Beller, Aurora, Ill.

[73] Assignee: Belson Manufacturing Co., Inc., North Aurora, Ill.

[21] Appl. No.: 909,095

[22] Filed: Jul. 2, 1992

[51] Int. Cl.$^5$ .............................................. A47J 37/00
[52] U.S. Cl. ...................................... 99/340; 99/448; 99/450; 99/482; 126/25 R; 126/9 R
[58] Field of Search .................. 99/339, 340, 444-446, 99/448, 450, 481, 482, 449; 126/25 R, 9 R, 41 R

[56] References Cited

U.S. PATENT DOCUMENTS

| 2,399,163 | 4/1946 | Brunamonti . | |
|---|---|---|---|
| 2,790,380 | 4/1957 | Shryack . | |
| 3,447,445 | 6/1969 | Koziol | 99/339 |
| 3,561,348 | 2/1971 | Weir, Sr. | 99/446 |
| 3,683,791 | 8/1972 | Rast, Jr. | 99/340 |
| 3,792,654 | 2/1974 | Turner . | |
| 3,882,767 | 5/1975 | Oyler et al. | 99/340 |
| 4,348,948 | 9/1982 | Allison | 99/482 |
| 4,669,447 | 6/1987 | Kelly | 99/481 |
| 4,686,958 | 8/1987 | Skelton et al. | 126/25 R |
| 4,700,618 | 10/1987 | Cox, Jr. | 99/482 |
| 4,721,037 | 1/1988 | Blosnich | 126/41 R |
| 4,757,756 | 7/1988 | Van Marr | 99/482 |
| 4,760,776 | 8/1988 | Beidler . | |
| 4,869,163 | 9/1989 | Haskins . | |
| 4,882,985 | 11/1989 | Beller . | |
| 4,934,260 | 6/1990 | Blevins . | |

FOREIGN PATENT DOCUMENTS 2520271 11/1976 Fed. Rep. of Germany ........ 99/482

OTHER PUBLICATIONS

"The Grill Lover's Catalog" published by Char-Broil Company of Columns, Ga., pp. 16-18, undated.

Primary Examiner—Timothy F. Simone
Attorney, Agent, or Firm—Lee, Mann, Smith, McWilliams, Sweeney & Ohlson

[57] ABSTRACT

A two-part smoker assembly having a slide-detachable fire chamber engageable to a separable smoking chamber, the latter capable of being mountably rested atop the firebox walls of a grill. The slide-detachable smoking chamber has front and rear access doors, a side opening for side-attaching the fire chamber thereto, a top-opening for mounting a cover lid thereon, and food racks for supporting food materials within the smoking chamber. Within the smoking chamber, rack supports for the food racks are provided for adjusting the food racks to various levels. The cover is hinged and consists of a central piano hinge, which divides the cover lid into two openable halves and allows access to the food racks from the top front or top rear of the assembly. The slide-detachable fire chamber includes a stoking door to facilitate loading a fuel source, such as, wood, a gas assist apparatus, a bottom ash pit, an ash door for holding and emptying ashes, draft dampers, and a smoke outlet for communication to the side opening of the smoking chamber.

17 Claims, 4 Drawing Sheets

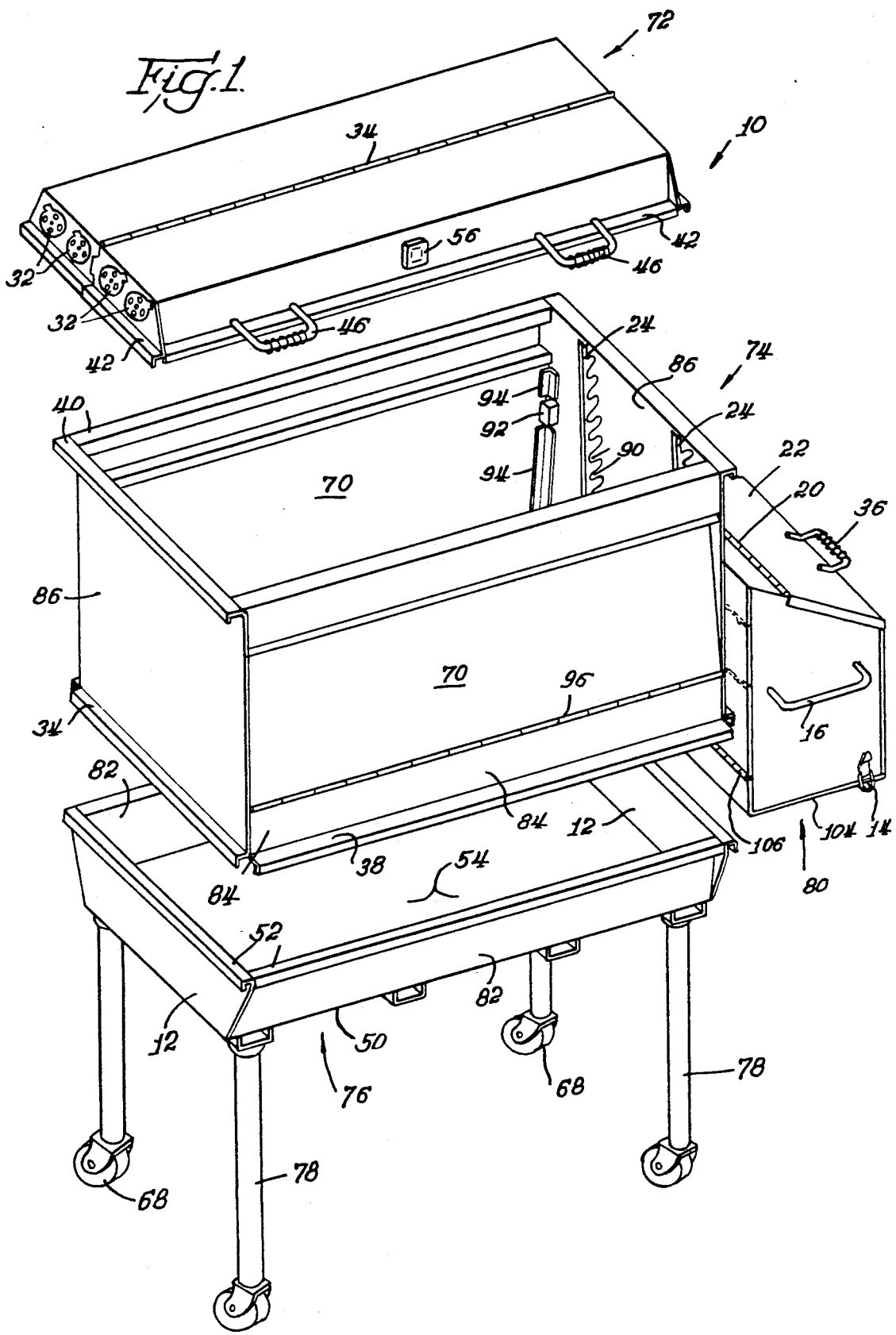

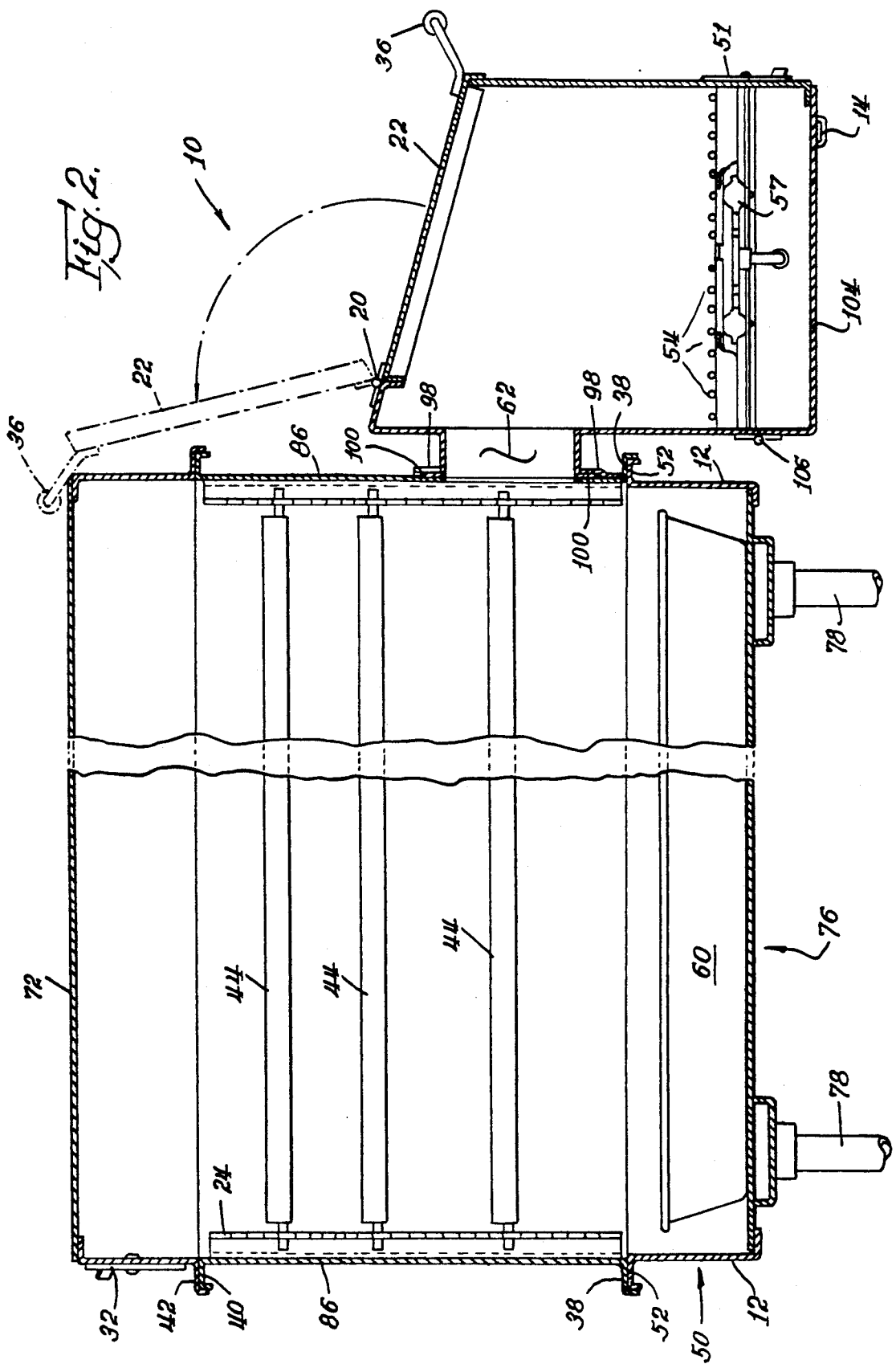

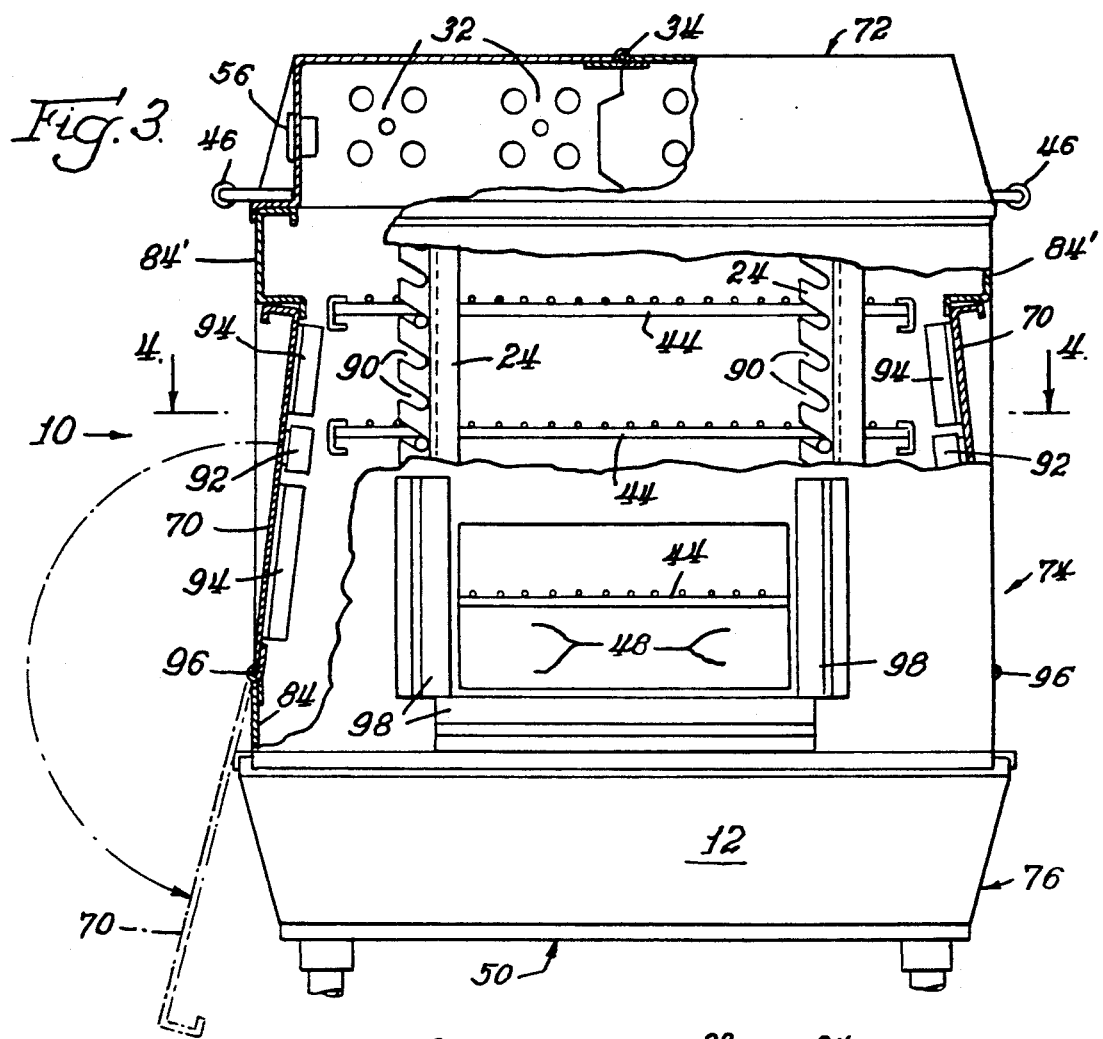
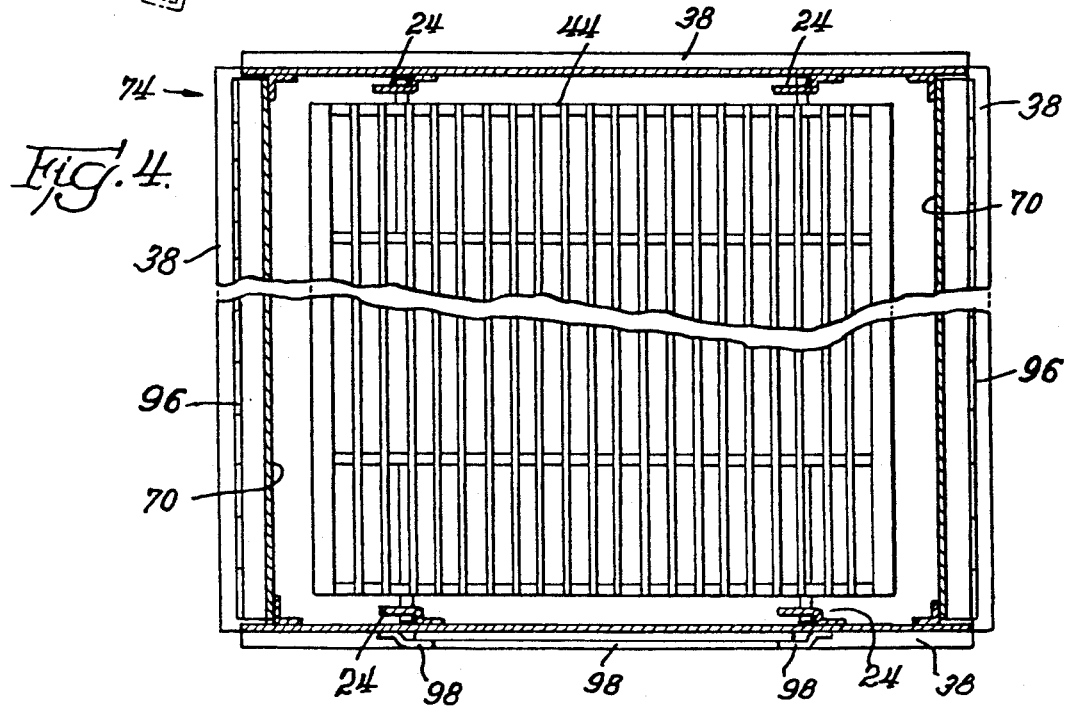

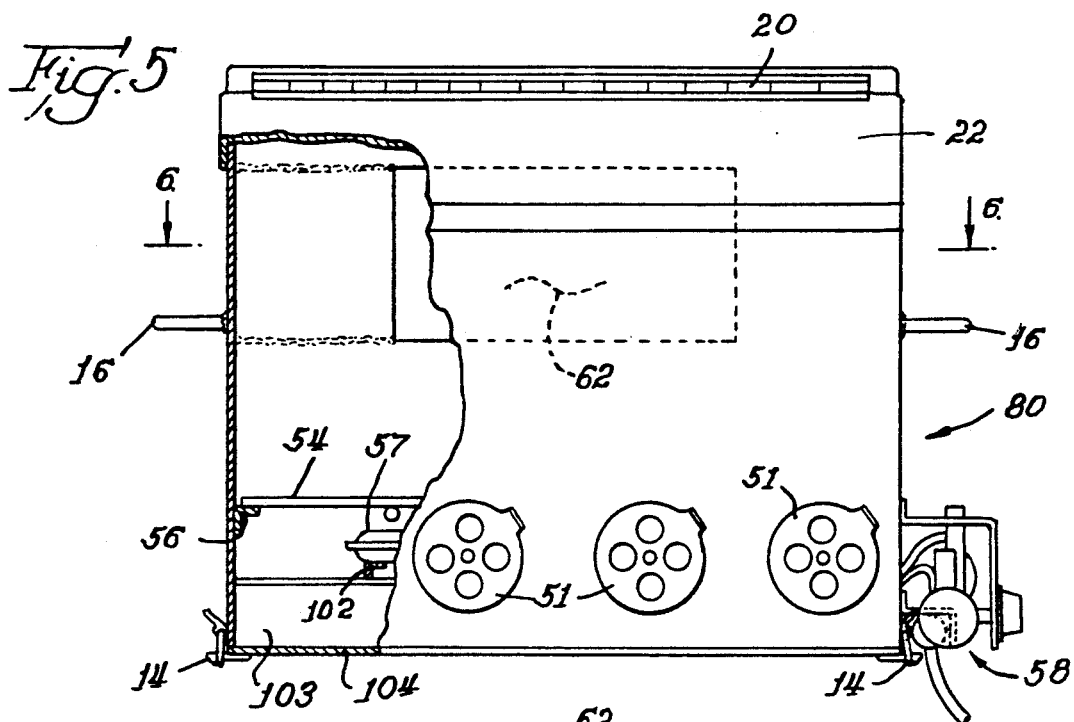
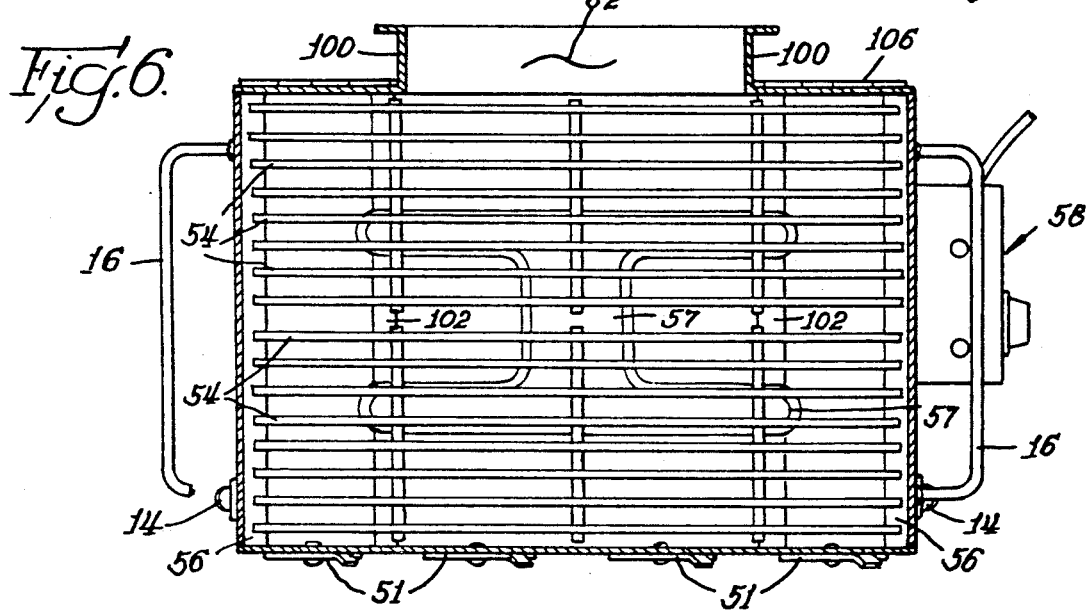
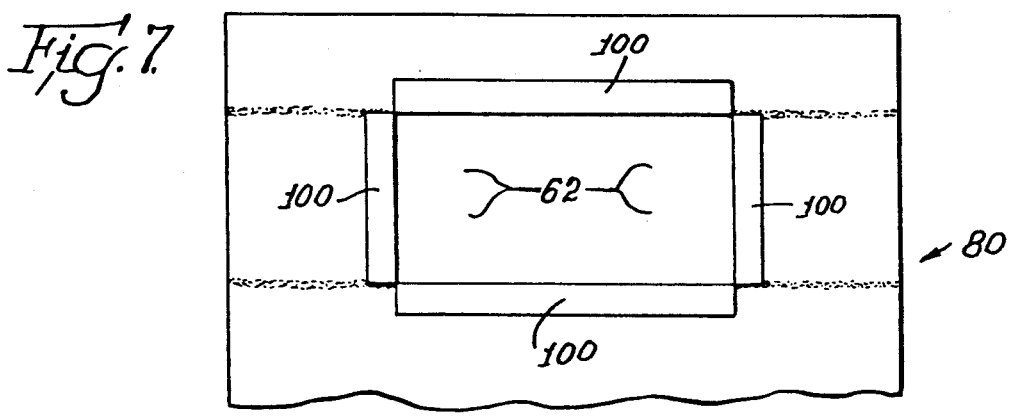

SMOKER ASSEMBLY

FIELD OF INVENTION

This invention relates in general to an improved smoker assembly for smoking foods. In particular the invention is directed to an outdoor smoker assembly mountable onto a barbeque grill and which has an independent heating source.

DESCRIPTION OF PRIOR ART

There exists many different types of apparatus used for cooking and smoking food materials such as meat and the like.

The most traditional outdoor food preparation apparatus is of the type which sole function is to cook food such as fish, chicken, pork, steak, hamburger and the like. These outdoor cooking apparatus typically use charcoal, mesquite, wood or gas burners, arranged in a rectangular firebox below a grill surface.

Another type of outdoor food preparation apparatus is of the type which sole function is to add flavor to foods by way of heating wood chips to produce smoke. The flavor produced by heated wood chips is imparted from the smoke to the foods within the smoking apparatus.

A further type of apparatus used in outdoor food preparation is of the type which combines the cooking and smoking functions of the two types of apparatus previously mentioned. This combination eliminates the need for two separate devices and may utilize one heating source for both cooking and smoking or alternatively, include a separate heat source for the smoking function.

U.S. Pat. No. 4,721,037 discloses a smoking apparatus used as a food smoking attachment in combination with a standard outdoor barbeque grill. This invention provides a means for converting the outdoor barbeque grill into a smoking apparatus. The food is smoked within the same chamber the fire for cooking resides. Although, this invention provides the benefit of converting an existing outdoor barbeque grill into a smoking apparatus, the invention is limited to one chamber for cooking and smoking. By only utilizing one chamber, the advantage of cooking tenderer meats by deep smoking at cooler temperatures is lessened. Additionally, the possibility of fire flareups and overcooking is heightened.

One attempt at separating a smoker fire source for indirect heating and smoking in an adjacent closed grill is advertised by Char-Broil, Co., Columbus, Ga., under the name HONDO. However, this device does not provide a separable smoker assembly and employs the familiar drum, or barrel shaped, construction which limits space utilization and the capability of multi-level interchangeable food racks of equal size. Also this device cannot convert to a barbeque grill for rotisserie or adjustable grill configurations desirable for large scale devices used for carnivals, fairs, club picnics, and the like, where large amounts of food items must be cooked or smoked all at once.

Accordingly, it is the object of this invention to provide a new and improved smoker assembly which improves upon and unites the best features of prior art smokers, which attach to outdoor cooking apparatus and traditional combination cooking and smoking apparatus, including offset fire chambers, in a unique two-part assembly readily mounted to a large multi-function barbeque grill device.

Another object of the present invention is to provide an accessory-type cooking and smoking assembly without the need to change the structure of the assembly when changing from cooking to smoking and vice versa.

Another object on the invention is to provide a means for moisturizing and flavoring the foods.

Another object is to provide for easy accessibility to the food within the assembly.

A further desired achievement is to obtain a two-part assembly wherein a fire-chamber is slide-attachable to a separable smoking chamber resting on a grill.

Yet another object is to provide a number of positions in which the level of the foods located in the assembly may be adjusted during smoking.

Still another goal is to provide a fire-chamber for accommodating burning wood, mesquite, charcoal and the like with a gas-assist burner.

Other objects, advantages, and novel features of the present invention will become apparent form the following detailed description of the invention when considered in conjunction with the accompanying drawings.

SUMMARY OF THE INVENTION

The present invention relates to an assembly for smoking foods in combination with an existing outdoor barbeque grill firebox having a grill-mountable smoking chamber and slide-attachable fire chamber. The grill firebox itself serves as a table for the smoking chamber and has an open top, a closed bottom, front and rear sidewalls for holding charcoal, and the like, during normal cooking, or a liquid container for moisturization during smoking. A removable smoking chamber is disposed upon the outside edges of the firebox. The four sided smoking chamber is a box-like rectangular enclosure and has front and rear access doors, and a side opening which is a smoke inlet communicating with the fire chamber during smoking. The bottom of the smoking chamber is open to the barbeque grill firebox so that the grill is not disturbed during smoking, while also offering the capability of placing a water pan in or on the grill for moisturizing the food in the smoke chamber.

A removable piano-hinged cover lid is disposed upon the top of the smoking chamber for retaining heat within the chamber. The cover lid allows access into the smoking chamber by lifting either the front half about the hinge or lifting the rear half about the hinge. Thereby the smoking chamber has four access doors thereto by virtue of the front and rear doors. Within the smoking chamber are food rack supports with a plurality of slots for adjustably holding equal-sized large food racks at various levels above the firebox. The side opening of the smoking chamber has flanges arranged adjacent thereto, which allows for the slide-attachment of the fire chamber for the entry of smoke therefrom. Within the fire chamber is a gas burner with fuel grates mounted above for holding smoldering wood, or the like. An ash pit to collect ashes from the burning wood chips is below the gas burner and the bottom floor of the ash pit forms an openable ash clean out door for disposing ash. A stoking door is provided atop the fire chamber for inserting wood chips or other material for smoking and flavoring the food.

BRIEF DESCRIPTION OF THE DRAWINGS

The invention will be more fully understood and appreciated in conjunction with the drawings wherein:

FIG. 1 is an exploded perspective view of the smoker assembly above a barbeque grill firebox;

FIG. 2 is a lengthwise central cross-sectional view of the smoker assembly mounted on a firebox as in FIG. 1;

FIG. 3 is an end view, partially broken-away in section, showing cover lid damper vents of the smoking chamber, front and rear access doors, food racks, food rack supports, and firebox-engageable wall flanges of the assembly as in FIG. 1;

FIG. 4 is a horizontal sectional view of the smoking chamber of FIG. 1, taken along line 4—4, looking in the direction of the arrows;

FIG. 5 is an end view, partially in section, of the fire chamber;

FIG. 6 is a horizontal sectional view of the fire chamber of FIG. 5, taken along line 6—6, looking in the direction of the arrows; and FIG. 7 is an end view of the fire chamber opposite the end in FIG. 5 and showing the mounting flanges and smoke passageway to the smoking chamber.

DETAILED DESCRIPTION OF THE INVENTION

The invention will now be more specifically described in conjunction with the foregoing drawings wherein like reference numerals refer to the same elements throughout.

FIG. 1 shows a two-part smoker assembly accessory 10 positioned above a firebox 50 of a standard barbeque grill 76 in accordance with the present invention. The assembly 10 may be generally described as providing a piano hinged 34 cover lid 72 that covers over a box-like removable smoking chamber 74 below, which comprise the first part of the assembly. The assembly 10 also provides a second part, namely a removable fire chamber 80, which slide-attaches to the smoking chamber 74. Both the piano hinged cover lid 72 and the smoking chamber 74 are removably supported atop the grill 76 having the firebox 50 including a bed portion 54 for containing charcoal, or the like during normal cooking, or an optional water container 60 (FIG. 2) during smoking. The firebox 50 is supported by legs 78 movable upon lower wheels 68. A significant characterizing feature of the smoker assembly 10 is the capability of quick and secure attachment atop a barbeque grill 76 wherein fasteners are not required and the smoking chamber 74 is easily placed atop upper flanged edges 52 at lower flanged lips 38 of the firebox walls as will be explained. Thereafter the piano hinged cover lid 72 may be placed atop the smoking chamber 74 to enclose it, or alternatively may be placed atop prior to placing the smoking chamber 74 atop the barbeque grill 76. Likewise, the fire chamber 80 may be attached to the side of the smoking chamber 74, or alternatively may be attached thereto prior to placing the smoking chamber 74 atop the grill 76.

The firebox 50 of the standard barbeque grill 76 has a rectangular configuration in plan. Opposing long front and rear walls 82 and opposing shorter end walls 12 of the firebox 50 support thereabove front and rear walls 84, and shorter end walls 86, respectively, of the smoking chamber 74. Metal access doors 70 are provided above the front and rear walls 84 of the smoking chamber 74. As best seen in the broken-away portion of FIG. 3, the doors 70 are hinged at 96 generally where they meet the walls 84. The doors 70 rotate upward about the hinges 96 into a closed position and thereby positioned against pairs of door stops 94 located at both the front and rear of the smoking chamber 74. The doors 70 are locked in the closed position by means of frictional engagement with the top portions 84' of the walls 84 and by magnetism generated by magnets 92 located between the door stops 94 at the front and rear of the smoking chamber 74.

Two pairs of food rack supports 24 extending from the top to the bottom of the smoking chamber 74 are located inside the smoking chamber 74 and adjacent to each of opposite end walls 86 of the smoking chamber 74. The food rack supports 24 are comprised of slots 90 which enable generally equal-sized food racks 44 to be selectively located in a plurality of vertical elevations above the firebox bed 50.

A rectangular opening 48 is located at one end wall 86 of the smoking chamber 74 to allow heat and smoke to enter thereto from the fire chamber 80. Located on the outside portion of end wall 86 of the smoking chamber 74, adjacent the left, right and bottom sides of the opening 48, are flanged mounts 98 for slide-attaching cooperative portions of the fire chamber 80 as will be explained.

As seen in FIG. 1, the cover lid 72 is hinged at piano hinge 34 lengthwise generally along the center line thereof. Thus, the cover lid 72 is openable at either side to provide two ways to gain access to the smoking chamber 74. Pairs of handles 46 are attached to both the front and rear of the cover lid 72 to aid in opening and closing the cover lid 72. The cover lid 72 allows for access to food on the food racks 44 (FIG. 2) inside the smoking chamber 74 from the top at both the front and rear of the smoker assembly 10. Additionally, the doors 70 allow access from the front and rear below the lid 72. Thus, there are four access ways to the food racks 44. Draft dampers 32 are located on the cover lid 72 generally longitudinally opposite the opening 48 to effect flow through the smoking chamber 80. A thermometer 56 is located in the center of the front of the cover lid 72.

As seen in FIG. 2, 3, 6 and 7, the fire chamber 80 is slide-attached to the smoking chamber 74 by means of a peripheral flanged lip 100 surrounding end opening 62 of the fire chamber 80. The bottom left and right parts of the lip 100 slide into the inside of the three flanged mounts 98 attached around the opening 48 (FIG. 3) of the smoking chamber 74 and against the end wall 86. The top horizontal part of the lip 100 resides freely against the end wall 86 of the smoking chamber 80 and the lip 100 thereby sealing encircles the opening 48. A hinged stoking door 22 is pivotally mounted at 20 to the top of the fire chamber 80. A handle 36 is attached to the front of the door 22 stoking to facilitate pivoting it at 20 to open or close.

As seen in FIG. 5, carrying handles 16 are attached to both sides of the fire chamber 80 enabling it to be slide attached, and detached, with the flanged mounts 98. Air intake dampers 51 are located across the bottom portion of the fire chamber 80 opposite the opening 62. A fuel grate 54 extends across the inside perimeter of the fire chamber 80 (FIG. 6). The fuel grate 54 is supported inside the fire chamber 80 by grate supporters 56 which extend across both the front and rear of the fire chamber 80. For assistance in combustion, gas burner 57, having valve control 58, is supported beneath the grate 54 by burner supports 102 which extend across the fire chamber 80 over an ash pit 103. A clean-out ash pit door 104 comprises the bottom of the fire chamber 80 and is hinged at 106 (FIG. 1) just above the bottom of the fire chamber 80 at the side of the fire chamber 80 adjacent the smoking chamber 74. Latches 14 for closure of the ash door 104 are located on opposite sides of the fire chamber 80.

The smoking chamber 74 is provided to be substantially sealed atop the barbeque grill 76 so that the smoke from the fire chamber 80 permeates the food in a controlled manner by means of adjusting the draft dampers 32 on the cover lids 72 and the air intake dampers 51 of the fire chamber 80. This sealing enclosure is obtained by the means of the cover lid 72 including lower flanges 42 that supportively overlap atop flanges 40, which flanges 40 comprise the upper edges of the walls 84 and 86 of the smoking chamber 74. Similarly, the lower portions of the walls 84 and 86 have overlapping flanges provided by the flange lips 38, which supportingly engage and overlap the upper flanged edges 52 of the walls 12 and 82 of the firebox 50. Also, in that way, no additional mechanical fasteners are required for the attachment of the cover lid 72 to the smoking chamber 74 and the barbeque grill 76, because the overlapping flange configurations as just described securely prevent dislocation or shifting and facilitate secure support engagement therebetween.

While the smoker assembly 10 may be made of a variety of materials, preferably, the cover lid 72, smoking chamber 74 and fire chamber 80, comprise heat resistant 12 or 16 gauge sheet steel, as would be understood by those skilled in the art.

While the invention has been described in connection with the above-disclosed embodiment, other equivalents will be understood to fall within the scope of the claims appended hereto.

What is claimed is:

1. A two-part smoker assembly having a first part and second part for attachment to a barbeque grill for converting the grill to a food smoking device, comprising:

a smoking chamber comprising said first-part of the assembly, said smoking chamber having a rectangular box-like configuration and comprising four walls, including two long opposing walls having pivotally openable doors for granting access to the interior of the smoking chamber, said smoking chamber further including a plurality of food rack supports, food racks supportable on said food rack supports at any of a selectable variety of elevations therein, a removable hinged cover lid for covering over the smoke chamber whereby to enclose it for forming a box-like enclosure mountable on the firebox of a barbeque grill, said cover lid including means for opening said cover lid at either of two locations and the cover lid further having draft dampers, said smoking chamber further including an aperture with engageable means therearound for engaging slide-engageable means of a fire chamber; and, said second part comprising a slide-attachable fire chamber for combusting fuel to create smoke for said smoking chamber, said fire chamber including an aperture for egress of smoke therein, said aperture having arranged adjacent thereto slide-engageable means for engaging the engageable means of said smoking chamber and said slide-engageable means including means for sealing placement around said aperture of the smoking chamber to thereby sealingly join said apertures of the fire chamber and the smoking chamber, said fire chamber further including a stoking door for adding fuel, a grate for holding, and a clean-out door for cleaning the ash products of combustion.

2. The smoker assembly as claimed in claim 1 wherein the fire chamber including a gas burner for assisting combustion.

3. The smoker assembly as claimed in claim 1 wherein said fire chamber further including a draft damper.

4. The smoker assembly as claimed in claim 3 wherein said draft damper being arranged at a side opposite the aperture for the egress of smoke.

5. The smoker assembly as claimed in claim 1 wherein said long walls of said smoking chamber include doorstep means for said doors arranged on said long walls.

6. The smoker assembly as claimed in claim 1 wherein the four walls of said smoking chamber include lower flanges for overlapping engagement atop firebox walls of a barbeque grill.

7. A smoker assembly for attachment to a barbeque grill, comprising:

a pivotal cover lid having a piano hinge, said cover lid being rectangular in configuration wherein said piano hinge runs centrally and longitudinally therealong, said cover lid further including means for manually grasping to pivot open said cover lid from either of two sides, a four wall box-like enclosure capable of receiving thereon the cover lid for forming therewith an enclosed smoking chamber, said four walls comprising two opposing long walls and two opposing short walls, said long walls each including pivotally openable doors for granting access to the smoking chamber, and one of said short walls having a smoke receivable aperture therethrough for receiving smoke from a fire chamber, said walls having means for supportive engagement on the walls of the firebox of a barbeque grill whereby to arrange the enclosed smoking chamber over a barbeque grill; and, A fire chamber having means for mounting to the short wall of said smoking chamber at said smoke receivable aperture and having means for combusting fuel therein whereby to generate smoke for passage from an aperture thereof to said smoke receivable aperture of said smoking chamber, said fire chamber being detachably arranged with said smoking chamber and including means for granting access to said means for combusting fuel to stoke fuel therein and means for cleaning ash therefrom.

8. The smoker assembly as claimed in claim 7 wherein said smoking chamber further includes food rack supports and food racks supported thereon.

9. The smoker assembly as claimed in claim 8 wherein said food rack supports comprise a pair of slotted food rack supports at each said short wall, whereby said food racks extend therebetween.

10. The smoker assembly as claimed in claim 9 at least wherein at least two racks are provided and are capable of being selectively positioned at various vertical elevations within said smoking chamber.

11. The smoker assembly as claimed in claim 7 said cover lid includes draft dampers.

12. The smoker assembly as claimed in claim 7 wherein said fire chamber further includes a gas assist burner assembly for combusting a gas fuel.

13. The smoker assembly as claimed in claim 12 wherein said gas assist assembly resides in said fire chamber below a fuel grate for disposition thereon of a combustible fuel source.

14. The smoker assembly as claimed in claim 7 wherein said means for granting access comprises a door arranged at the top of the fire chamber.

15. The smoker assembly as claimed in claim 7 wherein means for cleaning ashes comprises a pivotal door arranged at the bottom of said fire chamber.

16. The smoker assembly as claimed in claim 7 further including a water container for cooperation with said smoking chamber for placement into or on a barbeque grill.

17. The smoker assembly as claimed in claim 7 wherein said walls of the box-like smoke chamber include lower flanges for supportive engagement on the walls of the firebox of a barbeque grill.

* * * * *